US011165960B2

(12) United States Patent
Lee et al.

(10) Patent No.: US 11,165,960 B2
(45) Date of Patent: Nov. 2, 2021

(54) ELECTRONIC DEVICE AND METHOD FOR PROCESSING IMAGE THEREOF

(71) Applicant: Samsung Electronics Co., Ltd., Suwon-si (KR)

(72) Inventors: Sehyun Lee, Suwon-si (KR); Wonseok Song, Suwon-si (KR); Bohee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/165,260

(22) Filed: Feb. 2, 2021

(65) Prior Publication Data

US 2021/0250505 A1 Aug. 12, 2021

(30) Foreign Application Priority Data

Feb. 7, 2020 (KR) .......................... 10-2020-0015249

(51) Int. Cl.
*H04N 5/232* (2006.01)
(52) U.S. Cl.
CPC ..... *H04N 5/23267* (2013.01); *H04N 5/23258* (2013.01); *H04N 5/23277* (2013.01); *H04N 5/23293* (2013.01)
(58) Field of Classification Search
CPC ........... G06T 7/215; G06T 7/20; G06T 7/254; H04N 5/145; H04N 5/144; H04N 5/23248;

(Continued)

(56) References Cited

U.S. PATENT DOCUMENTS 8,786,677 B2 * 7/2014 Yano .................... H04N 5/2328
348/46
8,941,743 B2 * 1/2015 Petrescu ............ H04N 5/23254
348/208.1

(Continued)

FOREIGN PATENT DOCUMENTS

JP 2016-158052 A 9/2016

OTHER PUBLICATIONS

International Search Report dated Jun. 1, 2021; International Appln. No. PCT/KR2021/001362.

*Primary Examiner* — Chiawei Chen
(74) *Attorney, Agent, or Firm* — Jefferson IP Law, LLP

(57) ABSTRACT

An electronic device is provided. The electronic device includes a display, a camera, at least one sensor, a memory, and a processor operatively connected to the display, the camera, the at least one sensor, and the memory. According to an embodiment, the memory may store instructions that, when executed, cause the processor to capture an image using the camera, detect a motion of the electronic device using the at least one sensor, detect the motion of the electronic device by analyzing the image when a magnification of the camera exceeds a specified value, correct the image based on the motion detected using the at least one sensor when a difference between a first motion value corresponding to the motion detected using the at least one sensor and a second motion value corresponding to the motion detected by analyzing the image exceeds a specified threshold value, and correct the image based on the motion detected by analyzing the image when the difference between the first motion value and the second motion value is equal to or less than the specified threshold value.

20 Claims, 5 Drawing Sheets

(58) Field of Classification Search
CPC .......... H04N 5/23251; H04N 5/23254; H04N 5/23258; H04N 5/23267; H04N 5/23277; H04N 5/23293
See application file for complete search history.

(56) References Cited

U.S. PATENT DOCUMENTS

| | | | |
|---|---|---|---|
| 9,554,042 B2 * | 1/2017 | Petrescu | H04N 5/23254 |
| 9,860,448 B2 | 1/2018 | Yoo et al. | |
| 2010/0149352 A1 | 6/2010 | Jang et al. | |
| 2010/0194898 A1 * | 8/2010 | Chiku | H04N 5/23254 |
| | | | 348/208.4 |
| 2014/0085492 A1 * | 3/2014 | Petrescu | H04N 5/23254 |
| | | | 348/208.1 |
| 2014/0085493 A1 * | 3/2014 | Petrescu | H04N 5/23248 |
| | | | 348/208.1 |
| 2015/0198818 A1 | 7/2015 | Miyasako | |
| 2016/0140695 A1 | 5/2016 | Yuan et al. | |
| 2017/0048462 A1 | 2/2017 | Keskin et al. | |
| 2020/0322534 A1 * | 10/2020 | Lee | H04N 5/23258 |

* cited by examiner

ELECTRONIC DEVICE AND METHOD FOR PROCESSING IMAGE THEREOF

CROSS-REFERENCE TO RELATED APPLICATION(S)

This application is based on and claims priority under 35 U.S.C. § 119(a) of a Korean patent application number 10-2020-0015249, filed on Feb. 7, 2020, in the Korean Intellectual Property Office, the disclosure of which is incorporated by reference herein its entirety.

BACKGROUND

1. Field

The disclosure relates to a technology of correcting an image captured using a camera.

2. Description of Related Art

Recently, various types of electronic devices have been developed and distributed. In particular, spread of mobile devices having various functions, such as smartphones, tablet personal computers (PCs), wearable devices, and the like, as well as existing desktop PCs is expanding.

Recently, various portable electronic devices include a camera, thereby providing an image capturing function. However, when an image is captured through the portable electronic device, shaking may occur in the captured image because of a motion of the camera during the capture. Accordingly, there is an increasing interest in a technology capable of obtaining a stable image during the image capturing through the electronic device.

The above information is presented as background information only to assist with an understanding of the disclosure. No determination has been made, and no assertion is made, as to whether any of the above might be applicable as prior art with regard to the disclosure.

SUMMARY

Various embodiments of the disclosure are intended to provide an electronic device and a method for processing an image of the electronic device capable of providing an image in which shaking occurred during image capturing is corrected.

Various embodiments of the disclosure are intended to provide an electronic device and a method for processing an image of the electronic device capable of increasing accuracy and reliability when correcting shaking of an image by correcting the image based on a magnification of a camera during image capture.

Aspects of the disclosure are to address at least the above-mentioned problems and/or disadvantages and to provide at least the advantages described below. Accordingly, an aspect of the disclosure is to provide an electronic device including a display, a camera, at least one sensor, a memory, and a processor operatively connected to the display, the camera, the at least one sensor, and the memory, wherein the memory stores instructions that, when executed, cause the processor to capture an image using the camera, detect a motion of the electronic device using the at least one sensor, detect the motion of the electronic device by analyzing the image when a magnification of the camera exceeds a specified value, correct the image based on the motion detected using the at least one sensor when a difference between a first motion value corresponding to the motion detected using the at least one sensor and a second motion value corresponding to the motion detected by analyzing the image exceeds a specified threshold value, and correct the image based on the motion detected by analyzing the image when the difference between the first motion value and the second motion value is equal to or less than the specified threshold value.

Another aspect of the disclosure is to provide a method for processing an image of an electronic device including a camera including capturing the image using the camera, detecting a motion of the electronic device using at least one sensor of the electronic device, detecting the motion of the electronic device by analyzing the image when a magnification of the camera exceeds a specified value, correcting the image based on the motion detected using the at least one sensor when a difference between a first motion value corresponding to the motion detected using the at least one sensor and a second motion value corresponding to the motion detected by analyzing the image exceeds a specified threshold value, and correcting the image based on the motion detected by analyzing the image when the difference between the first motion value and the second motion value is equal to or less than the specified threshold value.

Another aspect of the disclosure is to provide a storage medium storing computer-readable instructions, wherein the instructions, when executed by an electronic device, cause the electronic device to capture an image using a camera, detect a motion of the electronic device using at least one sensor of the electronic device, detect the motion of the electronic device by analyzing the image when a magnification of the camera exceeds a specified value, correct the image based on the motion detected using the at least one sensor when a difference between a first motion value corresponding to the motion detected using the at least one sensor and a second motion value corresponding to the motion detected by analyzing the image exceeds a specified threshold value, and correct the image based on the motion detected by analyzing the image when the difference between the first motion value and the second motion value is equal to or less than the specified threshold value.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
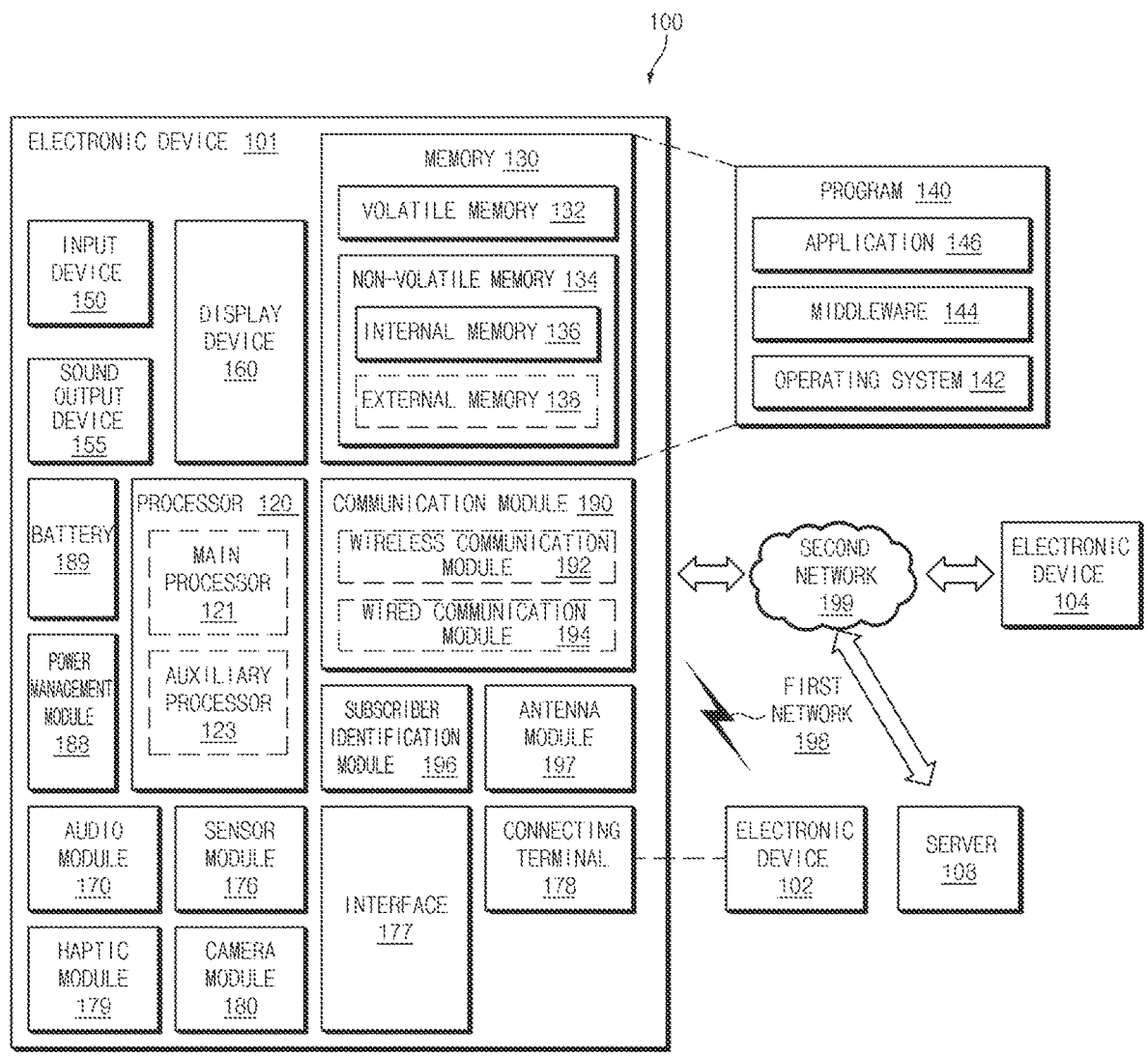
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
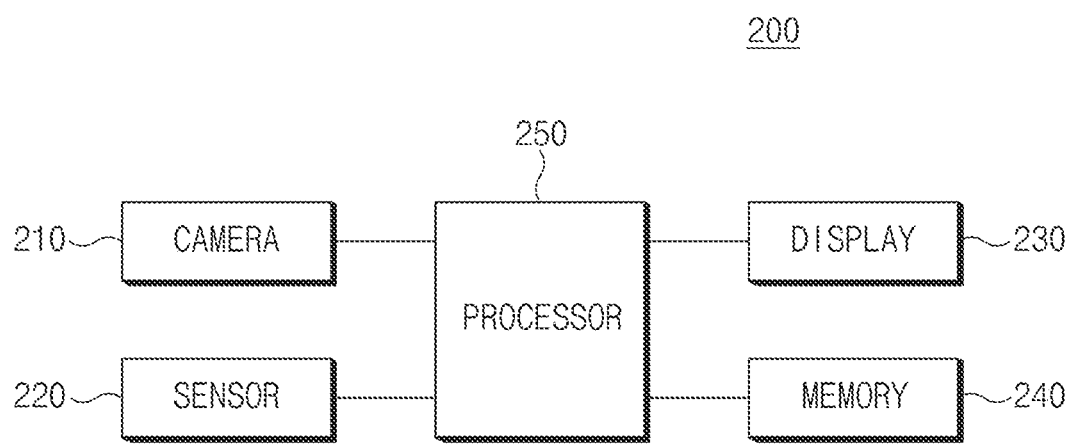
FIG. 2 is a block diagram of an electronic device according to an embodiment of the disclosure.

FIG. 2 is a block diagram of an electronic device according to an embodiment of the disclosure.

Referring to FIG. 2, an electronic device 200 (e.g., the electronic device 101 in FIG. 1) may include a camera 210 (e.g., the camera module 180 in FIG. 1), a sensor 220 (e.g., the sensor module 176 in FIG. 1), a display 230 (e.g., the display device 160 in FIG. 1), a memory 240 (e.g., the memory 130 in FIG. 1), and a processor 250 (e.g., the processor 120 in FIG. 1).

According to an embodiment, the camera 210 may capture an image. For example, the camera 210 may capture an object outside the electronic device 200. For example, the camera 210 may capture an image or a moving image. According to an embodiment, the camera 210 may adjust a magnification at a time of the capturing under control of the processor 250 or independently. According to an embodiment, the camera 210 may include at least a portion of the camera module 180 shown in FIG. 1.

According to an embodiment, the sensor 220 may detect a motion of the electronic device 200. For example, the sensor 220 may detect the motion of the electronic device 200 (e.g., the camera 210) while capturing the image through the camera 210. For example, the sensor 220 may detect a motion of each axis (e.g., an x-axis, a y-axis, a z-axis, a pitch, a yaw, or a roll) of the electronic device 200. According to an embodiment, the sensor 220 may include at least a portion of the sensor module 176 shown in FIG. 1. For example, the sensor 220 may include a gyro sensor.

According to an embodiment, the display 230 may display the image being captured through the camera 210. According to an embodiment, the display 230 may display an image (e.g., the image being captured or a corrected image) stored in the memory 240 under the control of the processor 250. For example, the display 230 may display an image selected based on a user input among the images stored in the memory 240. According to an embodiment, the display 230 may include a touch circuitry set to detect touch, a circuitry of the sensor 220 (e.g., a pressure sensor) set to measure a strength of a force generated by the touch, or a biometric sensor (e.g., a fingerprint sensor) set to acquire biometric information (e.g., a fingerprint) of the user. According to an embodiment, the display 230 may include at least a portion of the display device 160 shown in FIG. 1.

According to an embodiment, the memory 240 may store instructions that causes the processor 250 to perform a corresponding operation when executed. According to an embodiment, the memory 240 may at least temporarily store the image captured through the camera 210 or the image corrected by the processor 250. According to an embodiment, the memory 240 may include a frame buffer that at least temporarily stores the image being captured through the camera 210. According to an embodiment, the memory 240 may include at least a portion of the memory 130 shown in FIG. 1.

According to an embodiment, the processor 250 may include an image signal processor (ISP) and/or a digital image stabilization (DIS). According to an embodiment, an image signal processor or the digital image stabilization may be included in the camera 210.

According to an embodiment, the processor 250 may correct the image captured through the camera 210. For example, the processor 250 may perform a video digital image stabilization (VDIS) function by correcting the captured image.

According to an embodiment, the processor 250 may perform the VDIS function through a series of operations of detecting the motion of the electronic device 200, smoothing the motion of the image, and correcting the image. For example, the processor 250 may smooth the motion of the image based on the detected motion. For example, as at least a portion of the image correction, the processor 250 may crop at least a partial region of the captured image to perform image shaking correction.

According to an embodiment, the processor 250 may detect the motion of the electronic device 200 using the sensor 220 or detect the motion of the electronic device 200 by analyzing the captured image. For example, accurate measurement of an actual motion between two frames of the image captured by the camera 210 and an amount of rolling shutter distortion generated by the image sensor (e.g., a CMOS sensor) of the camera 210 may have a significant effect to improve a performance of the VDIS function. For example, when detecting the motion by analyzing the image, an accurate motion detection may be difficult in a low luminance condition, a condition in which there is no feature point to be tracked, and situations of a sudden change in a light source (illuminance), a large motion of a subject, a large rotational component, and the like. For example, when detecting the motion by analyzing the image, an amount of calculation of the processor 250 may increase to increase accuracy in the above situations. For example, while capturing a relatively high magnification image, a field of view (FOV) of the captured image is narrowed, so that it is difficult to extract the feature points within the captured image, or a region to be analyzed for the motion detection may increase as a magnitude of the motion increases depending on the magnification. As another example, when detecting the motion using the sensor 220 (e.g., a gyro sensor), an offset and a drift noise of the sensor 220 may cause an error of the motion detection. For example, in a condition in which an optical image stabilizer (OIS) of the electronic device 200 operates, when a value of a hall sensor for detecting the motion of the camera 210 is not accurately synchronized, the error may occur in the motion detection using the sensor 220. For example, when the motion is detected using a gyro sensor, an amount of change in an angular velocity may be estimated based on a basic magnification (e.g., 1x) of the camera 210 and may be calculated in proportion to the magnification of the camera 210 during the capturing to detect the motion, so that a possibility of occurrence of the error in the motion detection during the image capturing of the relatively high magnification may increase. For example, when the relatively high magnification image is being captured, a motion detection scheme using the sensor 220 may have high reliability in occurrence of the motion and an approximate motion degree. In detecting the motion degree, the motion detection using the image analysis may facilitate more accurate motion estimation.

According to an embodiment, when capturing the image using the camera 210, the processor 250 may detect the motion of the electronic device 200 using the at least one sensor 220. When the magnification of the camera 210 exceeds a specified value, the processor 250 may detect the motion of the electronic device 200 by analyzing the captured image. For example, when detecting the motion by analyzing the image, the processor 250 may calculate a motion vector based on information between frames of the image. For example, the processor 250 may calculate the motion vector of the electronic device 200 by analyzing images of at least two frames stored in the memory 240 (e.g., a frame buffer). According to an embodiment, the processor 250 may analyze the image using at least one of block matching, Kanade-Lucase-Tomasi (KLT) tracker, scale invariant feature transform (SIFT), and speeded up robust features (SURF) analysis schemes and detect the motion. For example, the processor 250 may extract and track the feature points contained in the image using the at least one of the above schemes, and detect the motion based on the feature points.

According to an embodiment, when the magnification of the camera 210 is equal to or less than the specified value during the image capture, the processor 250 may correct the image based on the motion detected using the sensor 220 without performing the motion detection through the image analysis.

According to an embodiment, when the magnification of the camera 210 exceeds the specified value during the image capture, the processor 250 may compare the motion detected using the sensor 220 and the motion detected by analyzing the image to analyze the image, thereby determining reliability of the detected motion and correcting the image using an appropriate motion detection value.

For example, the processor 250 may determine whether a difference between a first motion value corresponding to the motion detected using the sensor 220 and a second motion value corresponding to the motion detected by analyzing the image exceeds a specified threshold value. For example, when the difference between the first motion value and the second motion value exceeds the threshold value, the electronic device 200 may determine that the reliability of the motion (e.g., the first motion value) detected by analyzing the image is low. For example, when the difference between the first motion value and the second motion value is equal to or less than the threshold value, the electronic device 200 may determine that the reliability of the motion (e.g., the first motion value) detected by analyzing the image is high.

According to an embodiment, the processor 250 may specify the threshold value based on the magnification of the camera 210. For example, the larger the magnification of the camera 210, the larger the threshold value set by the processor 250 in proportion.

$$\text{Reliability(axis)} = \begin{cases} 1 & \text{if } abs(MVg(\text{axis}) - MVimg(\text{axis}) > Thr \\ 0 & eles \end{cases} \quad \text{Equation 1}$$

For example, referring to Equation 1, MVg (axis) means the first motion value corresponding to the motion detected using the sensor 220 for one axis, MVimg (axis) means the second motion value corresponding to the motion detected by analyzing the image for one axis, and Thr means the specified threshold value.

According to an embodiment, when reliability (reliability (axis)) for one axis is 1 based on Equation 1 above, the electronic device 200 may determine that the reliability of the motion detected by analyzing the image is low, and correct the image based on the motion detected using the sensor 220.

According to an embodiment, when the reliability (reliability (axis)) for one axis is 0 based on Equation 1 above, the electronic device 200 may determine that the reliability of the motion detected by analyzing the image is high, and correct the image based on the motion detected by analyzing the image.

According to an embodiment, the processor 250 may include at least a portion of the processor 120 shown in FIG. 1.

According to various embodiments, the electronic device 200 may further include at least some of the components of the electronic device 101 shown in FIG. 1.

Figure 3:
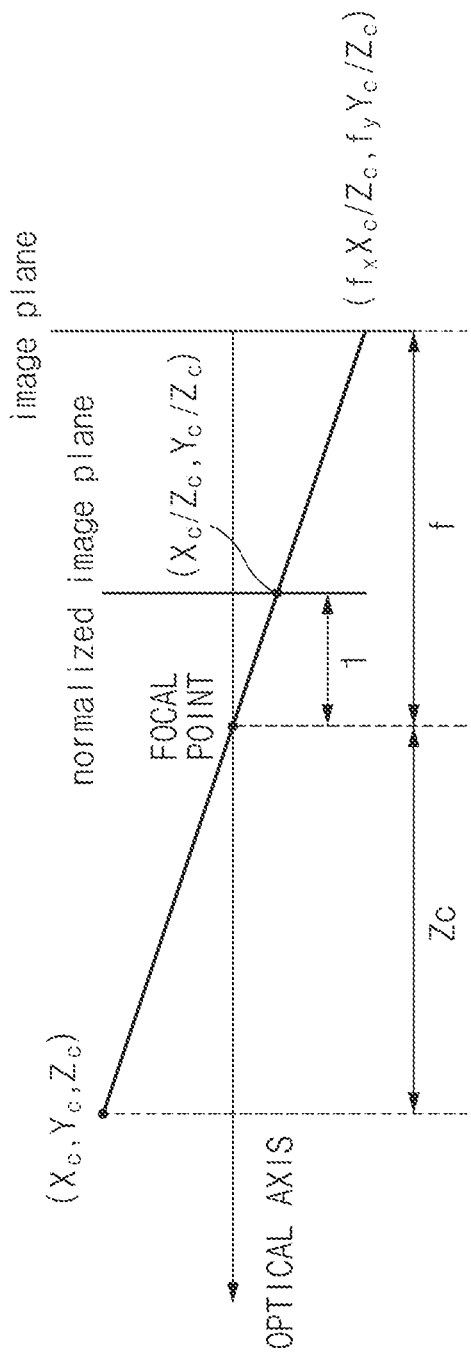
FIG. 3 is a diagram for describing capturing characteristics based on a change in a magnification of a camera during image capturing in an electronic device according to an embodiment of the disclosure.

FIG. 3 is a diagram for describing capturing characteristics based on a change in a magnification of a camera during image capturing in an electronic device according to an embodiment of the disclosure.

Referring to FIG. 3, a plane with a focal length of 1 unit distance is a normalized image plane, a plane on which an image is formed is an image plane, and ($X_c$, $Y_c$, $Z_c$) represents a camera coordinate system. For example, the focal length may mean a distance between a center of a lens of the camera (e.g., a camera of the electronic device 101 in FIG. 1 or the electronic device 200 in FIG. 2) and the camera (e.g., the image sensor (e.g., a CCD and a CMOS)).

According to an embodiment, as the magnification of the camera is changed, a focal length f of the camera may be changed. For example, as the magnification increases, the focal length of the camera may increase.

For example, the image of the high magnification may have a relatively small rotational component. For example, the capturing of the image of the high magnification may be mainly used for static capturing or panning capturing. For example, when the magnification of the image increases, magnification of the motion of the electronic device may also increase. For example, when the user of the electronic device walks or runs, even when the magnitude of the motion does not exceed a correction range in case of capturing of a relatively low magnification image, the magnitude of the motion may be out of the correction range in the case of the capturing of the image of the high magnification, so that stable correction may not be achieved. For example, the correction range may mean a range of a limit in which the image may be corrected that occurs because a size of an output image compared to an input image is specified when capturing the image through the camera. For example, when capturing the subject at a distance with the high magnification, even when a distance between the user (a cameraman) and the subject changes (e.g., when the user walks toward the subject), a change in a size of the subject within the captured image may be insignificant. For example, when capturing the image of the high magnification in general, the user (the cameraman) may be less likely to capture the image while moving. For example, when the user is capturing a specific subject with the high magnification using the electronic device (e.g., the camera), even when the user captures the image while walking toward the subject, the change in the size of the subject within the image is small, so that the user may usually capture the subject at a fixed location. In consideration of this, the image of the high magnification may generally be captured when a motion or a movement of the user is small. Accordingly, the image of the high magnification may have the small rotational component. For example, when the image of the high magnification has the small rotational component, a correction performance of the captured image may have a major effect on an overall shaking correction performance.

For example, the small rotational component in the high magnification image may mean that the motion detection scheme through the image analysis may be a more suitable motion detection scheme when detecting the motion of the electronic device. For example, in the high magnification image, an effect of the rotational component or 3D distortion is relatively less than that in the low magnification image, so that reliability may be increased when the feature points are extracted between the frames of the image or when a vertical or horizontal component vector is obtained through the block matching. For example, when detecting the motion from the high magnification image, and when using the motion detection scheme through the image analysis, synchronization with an OIS hall sensor may not be required unlike the motion detection scheme using the sensor, and the error of the motion detection that occurs because of noise of the sensor may be prevented.

In various embodiments of the disclosure, when the magnification of the camera exceeds the specified value, the reliability of the detected motion may be determined by analyzing the image. When the motion detected by analyzing the image is reliable, the image may be corrected based on the motion detected by selectively analyzing the image, so that accuracy and efficiency of the motion detection in the high magnification image may be improved.

An electronic device (e.g., the electronic device 101 in FIG. 1 and the electronic device 200 in FIG. 2) according to an embodiment may include a display (e.g., the display device 160 in FIG. 1 and the display 230 in FIG. 2), a camera (e.g., the camera module 180 in FIG. 1 and the camera 210 in FIG. 2), at least one sensor (e.g., the sensor module 176 in FIG. 1 and the sensor 220 in FIG. 2), a memory (e.g., the memory 130 in FIG. 1 and the memory 240 in FIG. 2), a processor (e.g., the processor 120 in FIG. 1 and the processor 250 in FIG. 2) operatively connected to the display, the camera, the at least one sensor, and the memory. According to an embodiment, the memory may store instructions that, when executed, cause the processor to capture an image using the camera, detect a motion of the electronic device using the at least one sensor, detect the motion of the electronic device by analyzing the image when a magnification of the camera exceeds a specified value, correct the image based on the motion detected using the at least one sensor when a difference between a first motion value corresponding to the motion detected using the at least one sensor and a second motion value corresponding to the motion detected by analyzing the image exceeds a specified threshold value, and correct the image based on the motion detected by analyzing the image when the difference between the first motion value and the second motion value is equal to or less than the specified threshold value.

According to an embodiment, the instructions may cause the processor to correct the image based on the motion detected using the at least one sensor when the magnification of the camera is equal to or less than the specified value.

According to an embodiment, the instructions may cause the processor to correct the image by performing at least one of motion smoothing processing and image warping processing.

According to an embodiment, the instructions may cause the processor to analyze the image using at least one of block matching, Kanade-Lucase-Tomasi (KLT) tracker, scale invariant feature transform (SIFT), and speeded up robust features (SURF) analysis schemes.

According to an embodiment, the instructions may cause the processor to specify the threshold value based on the magnification of the camera.

According to an embodiment, the instructions may cause the processor to display the captured image or the corrected image through the display.

According to an embodiment, the instructions may cause the processor to store the corrected image in the memory.

According to an embodiment, the at least one sensor may include a gyro sensor.

Figure 4:
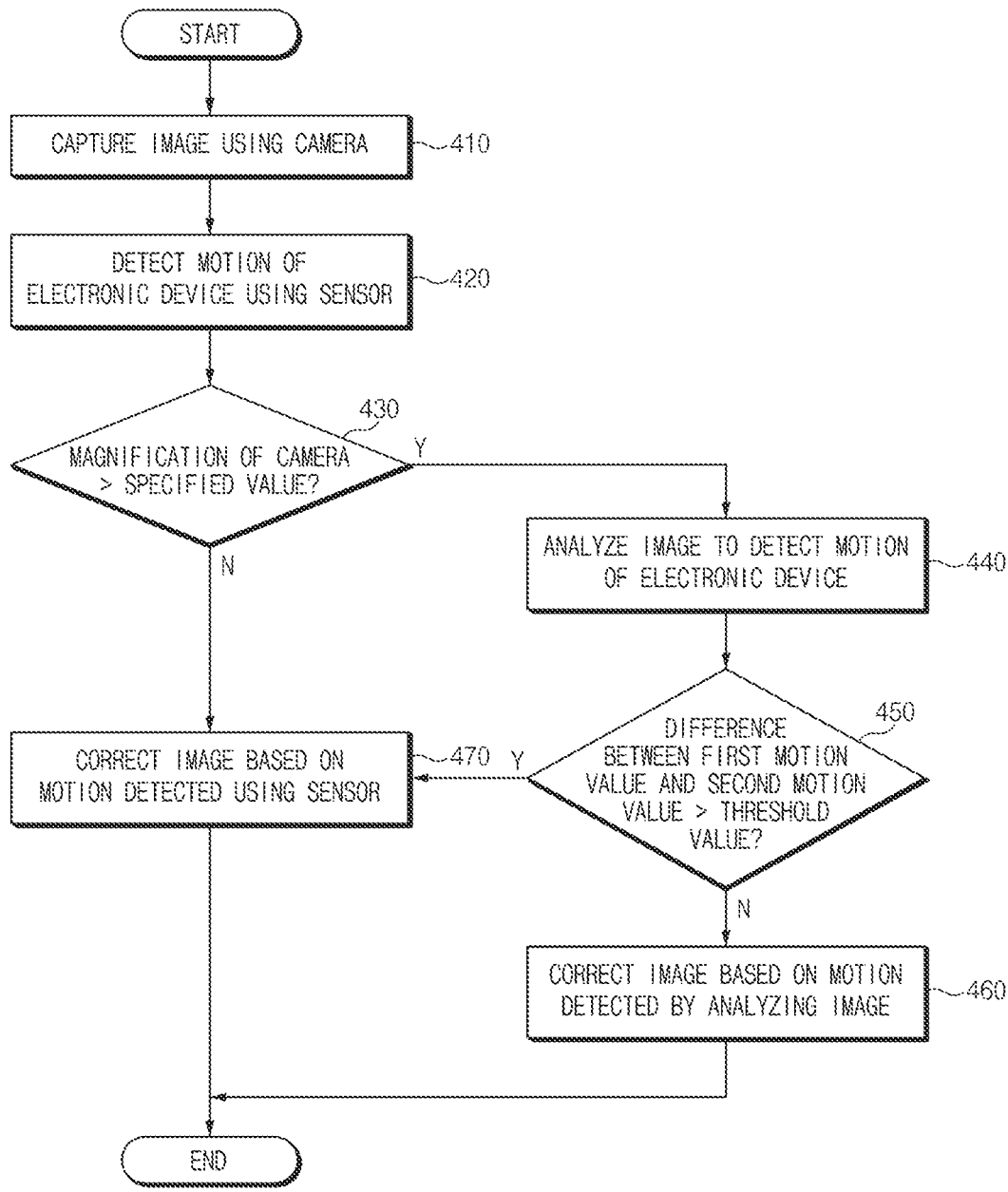
FIG. 4 is a flowchart of a method for processing an image of an electronic device according to an embodiment of the disclosure.

FIG. 4 is a flowchart of a method for processing an image of an electronic device according to an embodiment of the disclosure.

Referring to FIG. 4, in operation 410, the electronic device (e.g., the electronic device 101 in FIG. 1 and the electronic device 200 in FIG. 2) may capture the image using a camera (e.g., the camera module 180 in FIG. 1 and the camera 210 in FIG. 2). For example, the electronic device may capture an image of a specified magnification using the camera. According to an embodiment, the electronic device may at least temporarily store the captured image (e.g., at least one frame contained in the image) in a memory (e.g., the memory 130 in FIG. 1 and the memory 240 in FIG. 2). According to an embodiment, the electronic device may display the image being captured through a display (e.g., the display device 160 in FIG. 1 and the display 230 in FIG. 2). For example, the electronic device may display the image being captured as a preview image in real time.

According to an embodiment, in operation 420, the electronic device may detect the motion of the electronic device using a sensor (e.g., the sensor module 176 in FIG. 1 and the sensor 220 in FIG. 2). According to an embodiment, the sensor may include a gyro sensor. For example, the electronic device may detect the motion of the electronic device (e.g., the camera) during the image capturing using the gyro sensor.

According to an embodiment, in operation 430, the electronic device may determine whether the magnification of the camera exceeds a specified value. For example, the specified value may be a specified multiple (e.g., 5 times and 10 times) of a basic magnification of the camera. For example, the electronic device may determine whether the image is being captured with a high magnification exceeding the specified value. According to an embodiment, the electronic device may perform operation 440 when the magnification of the camera exceeds the specified value, and perform operation 470 when the magnification of the camera is equal to or less than the specified value.

According to an embodiment, in operation 440, the electronic device may analyze the image to detect the motion of the electronic device. For example, the electronic device may detect the motion of the electronic device (e.g., the camera) by analyzing the image being captured. According to an embodiment, the electronic device may use at least one of block matching, Kanade-Lucase-Tomasi (KLT) tracker, scale invariant feature transform (SIFT), and speeded up robust features (SURF) analysis schemes to analyze the image.

According to an embodiment, in operation 450, the electronic device may determine whether a difference between a first motion value corresponding to a motion detected using the at least one sensor and a second motion value corresponding to a motion detected by analyzing the image exceeds a specified threshold value. For example, the first motion value may be a motion estimated value calculated based on data detected using the sensor, and the second motion value may be a motion estimated value calculated based on the image analysis. According to an embodiment, the electronic device may determine reliability of the motion detected by analyzing the image depending on whether the difference between the first motion value and the second motion value exceeds the specified threshold value. For example, when the difference between the first motion value and the second motion value exceeds the specified threshold value, the electronic device may determine that the reliability of the motion detected by analyzing the image is low. For example, in the situation of capturing the image of the high magnification, the motion detected using the sensor may not have a more sophisticated value than the motion detected by analyzing the image in a degree (a magnitude) of the motion, but may have high reliability in detecting an occurrence of the motion. For example, the electronic device may compare the motion detected using the sensor with the motion detected by analyzing the image to identify the reliability of the motion detected by analyzing the image. According to an embodiment, the electronic device may perform operation 460 when the difference between the first motion value and the second motion value is equal to or less than the specified threshold value, and may perform operation 470 when the difference between the first motion value and the second motion value exceeds the specified threshold value.

According to an embodiment, in operation 460, the electronic device may correct the image based on the motion detected by analyzing the image. According to an embodiment, the electronic device may correct the image by performing at least one of motion smoothing processing and image warping processing based on the motion detected by analyzing the image. According to an embodiment, the electronic device may display the corrected image through the display. For example, the electronic device may display the corrected image as the preview image in real time.

According to an embodiment, in operation 470, the electronic device may correct the image based on the motion detected using the sensor. According to an embodiment, the electronic device may correct the image by performing at least one of the motion smoothing processing and the image warping processing based on the motion detected by analyzing the image. According to an embodiment, the electronic device may display the corrected image through the display. For example, the electronic device may display the corrected image as the preview image in real time.

According to an embodiment, when capturing the image with the magnification exceeding the specified value, the electronic device may identify the reliability of the motion detected by analyzing the image by comparing the motion detected using the sensor with the motion detected by analyzing the image, and correct the image based on an appropriate motion detecting scheme.

Figure 5:
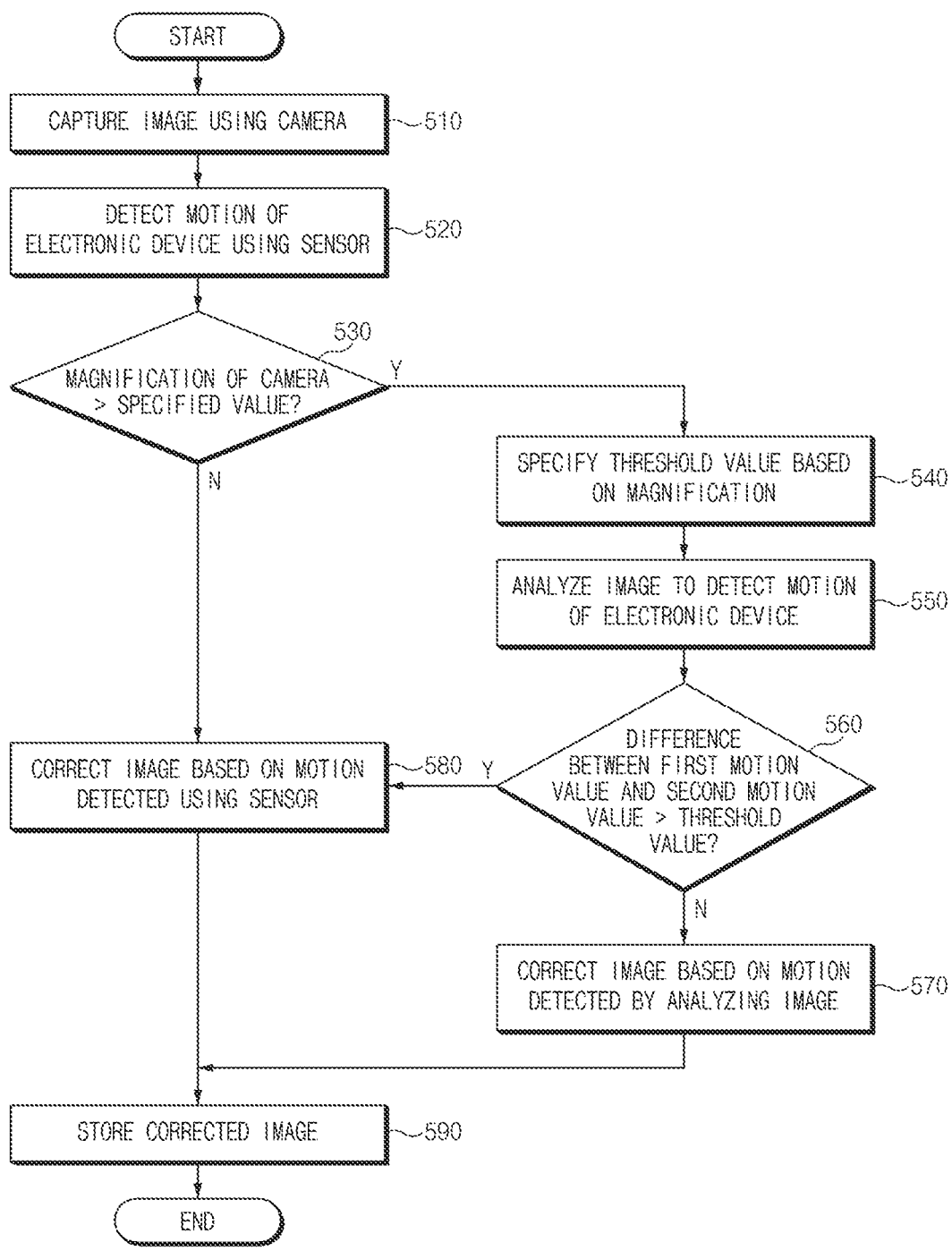
FIG. 5 is a flowchart of a method for processing an image of an electronic device according to an embodiment of the disclosure.

FIG. 5 is a flowchart of a method for processing an image of an electronic device according to an embodiment of the disclosure. Hereinafter, an operation the same as or similar to that described in FIG. 4 will be briefly described.

Referring to FIG. 5, in operation 510, the electronic device (e.g., the electronic device 101 in FIG. 1 and the electronic device 200 in FIG. 2) may capture the image using a camera (e.g., the camera module 180 in FIG. 1 and the camera 210 in FIG. 2). For example, the electronic device may capture an image of a specified magnification using the camera.

According to an embodiment, in operation 520, the electronic device may detect a motion of the electronic device using a sensor (e.g., the sensor module 176 in FIG. 1 and the sensor 220 in FIG. 2). According to an embodiment, the sensor may include a gyro sensor. For example, the electronic device may detect the motion of the electronic device (e.g., the camera) during the image capturing using the gyro sensor.

According to an embodiment, in operation 530, the electronic device may determine whether a magnification of the camera exceeds a specified value. For example, the electronic device may determine whether the image is being captured with a high magnification exceeding the specified value. According to an embodiment, the electronic device may perform operation 540 when the magnification of the camera exceeds the specified value, and may perform operation 580 when the magnification of the camera is equal to or less than the specified value.

According to an embodiment, in operation 540, the electronic device may specify a threshold value based on the magnification of the camera. For example, the electronic device may specify the threshold value in proportion to the magnification of the camera. For example, the electronic device may specify a relatively high threshold value as the magnification increases.

According to an embodiment, in operation 550, the electronic device may analyze the image to detect the motion of the electronic device. For example, the electronic device may detect the motion of the electronic device (e.g., the camera) by analyzing the image being captured.

According to an embodiment, in operation 560, the electronic device may determine whether a difference between a first motion value corresponding to a motion detected using the at least one sensor and a second motion value corresponding to a motion detected by analyzing the image exceeds a specified threshold value. For example, the first motion value may be a motion estimated value calculated based on data detected using the sensor, and the second motion value may be a motion estimated value calculated based on the image analysis. According to an embodiment, the electronic device may determine reliability of the motion detected by analyzing the image depending on whether the difference between the first motion value and the second motion value exceeds the specified threshold value. According to an embodiment, the electronic device may perform operation 570 when the difference between the first motion value and the second motion value is equal to or less than the specified threshold value, and may perform operation 580 when the difference between the first motion value and the second motion value exceeds the specified threshold value.

According to an embodiment, in operation 570, the electronic device may correct the image based on the motion detected by analyzing the image. According to an embodiment, the electronic device may correct the image by performing at least one of motion smoothing processing and image warping processing based on the motion detected by analyzing the image.

According to an embodiment, in operation 580, the electronic device may correct the image based on the motion detected using the sensor. According to an embodiment, the electronic device may correct the image by performing at least one of the motion smoothing processing and the image warping processing based on the motion detected by analyzing the image.

According to an embodiment, in operation 590, the electronic device may store the corrected image in a memory (e.g., the memory 130 in FIG. 1 and the memory 240 in FIG. 2). According to an embodiment, the electronic device may output an image selected based on a user input among images stored in the memory through the display.

According to an embodiment, when capturing the image with the magnification exceeding the specified value, the electronic device may identify the reliability of the motion detected by analyzing the image by comparing the motion detected using the sensor with the motion detected by analyzing the image based on the threshold value set based on the magnification, and correct the image based on an appropriate motion detecting scheme.

According to an embodiment, a method for processing an image of an electronic device (e.g., the electronic device 101 in FIG. 1 and the electronic device 101 in FIG. 2) including a camera (e.g., the camera module 180 in FIG. 1 and the camera 210 in FIG. 2) may include capturing an image using the camera, detecting a motion of the electronic device using at least one sensor (e.g., the sensor module 176 in FIG. 1 and the sensor 220 in FIG. 2) of the electronic device, detecting the motion of the electronic device by analyzing the image when a magnification of the camera exceeds a specified value, correcting the image based on the motion detected using the at least one sensor when a difference between a first motion value corresponding to the motion detected using the at least one sensor and a second motion value corresponding to the motion detected by analyzing the image exceeds a specified threshold value, and correcting the image based on the motion detected by analyzing the image when the difference between the first motion value and the second motion value is equal to or less than the specified threshold value.

According to an embodiment, the method may further include correcting the image based on the motion detected using the at least one sensor when the magnification of the camera is equal to or less than the specified value.

According to an embodiment, the image may be corrected by performing at least one of motion smoothing processing and image warping processing.

According to an embodiment, the detecting of the motion of the electronic device by analyzing the image may include analyzing the image using at least one of block matching, Kanade-Lucase-Tomasi (KLT) tracker, scale invariant feature transform (SIFT), and speeded up robust features (SURF) analysis schemes.

According to an embodiment, the method may further include specifying the threshold value based on the magnification of the camera.

According to an embodiment, the method may further include displaying the captured image or the corrected image through a display (e.g., the display device 160 in FIG. 1 and the display 230 in FIG. 2) of the electronic device.

According to an embodiment, the method may further include storing the corrected image in a memory (e.g., the memory 130 in FIG. 1 and the memory 240 in FIG. 2) of the electronic device.

According to an embodiment, the at least one sensor may include a gyro sensor.

In a storage medium storing computer-readable instructions according to an embodiment, when executed by an electronic device (e.g., the electronic device 101 in FIG. 1 and the electronic device 200 in FIG. 2), the instructions may cause the electronic device to capture an image using a camera (e.g., the camera module 180 in FIG. 1 and the camera 210 in FIG. 2), detect a motion of the electronic device using at least one sensor (e.g., the sensor module in FIG. 1 and the sensor 220 in FIG. 2) of the electronic device, detect the motion of the electronic device by analyzing the image when a magnification of the camera exceeds a specified value, correct the image based on the motion detected using the at least one sensor when a difference between a first motion value corresponding to the motion detected using the at least one sensor and a second motion value corresponding to the motion detected by analyzing the image exceeds a specified threshold value, and correct the image based on the motion detected by analyzing the image when the difference between the first motion value and the second motion value is equal to or less than the specified threshold value.

According to an embodiment, when executed by the electronic device, the instructions may cause the electronic device to correct the image based on the motion detected using the at least one sensor when the magnification of the camera is equal to or less than the specified value.

According to an embodiment, when executed by the electronic device, the instructions may cause the electronic device to specify the threshold value based on the magnification of the camera.

According to an embodiment, when executed by the electronic device, the instructions may cause the electronic device to display, through a display (e.g., the display device 160 in FIG. 1 and the display 230 in FIG. 2) of the electronic device, or store, in a memory (e.g., the memory 130 in FIG. 1 and the memory 240 in FIG. 2) of the electronic device, the captured image or the corrected image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed in the disclosure, a video digital image stabilization (VDIS) function may be provided to reduce the shaking during the image capture.

According to the embodiments disclosed in the disclosure, a more reliable image correcting function may be provided by selectively applying a scheme for detecting the motion based on the magnification of the camera.

According to the embodiments disclosed in the disclosure, when detecting the motion of the electronic device for the image correction, the more reliable image correction function may be provided by selectively applying a more appropriate motion detection scheme based on a situation.

In addition, various effects that are directly or indirectly identified through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a camera;
   at least one sensor;
   a memory; and
   a processor operatively connected to the display, the camera, the at least one sensor, and the memory,
   wherein the memory stores instructions that, when executed, cause the processor to:
   capture an image using the camera;
   detect a motion of the electronic device using the at least one sensor;
   detect the motion of the electronic device by analyzing the image when a magnification of the camera exceeds a specified value;
   correct the image based on the motion detected using the at least one sensor when a difference between a first motion value corresponding to the motion detected using the at least one sensor and a second motion value corresponding to the motion detected by analyzing the image exceeds a specified threshold value; and
   correct the image based on the motion detected by analyzing the image when the difference between the first motion value and the second motion value is equal to or less than the specified threshold value.

2. The electronic device of claim 1, wherein the instructions further cause the processor to correct the image based on the motion detected using the at least one sensor when the magnification of the camera is equal to or less than the specified value.

3. The electronic device of claim 1, wherein the instructions further cause the processor to correct the image by performing at least one of motion smoothing processing or image warping processing.

4. The electronic device of claim 1, wherein the instructions further cause the processor to analyze the image using at least one of block matching, Kanade-Lucase-Tomasi (KLT) tracker, scale invariant feature transform (SIFT), or speeded up robust features (SURF) analysis schemes.

5. The electronic device of claim 1, wherein the instructions further cause the processor to specify the specified threshold value based on the magnification of the camera.

6. The electronic device of claim 1, wherein the instructions further cause the processor to display the captured image or the corrected image through the display.

7. The electronic device of claim 1, wherein the instructions further cause the processor to store the corrected image in the memory.

8. The electronic device of claim 1, wherein the at least one sensor includes a gyro sensor.

9. A method for processing an image of an electronic device including a camera, the method comprising:
   capturing the image using the camera;
   detecting a motion of the electronic device using at least one sensor of the electronic device;
   detecting the motion of the electronic device by analyzing the image when a magnification of the camera exceeds a specified value;
   correcting the image based on the motion detected using the at least one sensor when a difference between a first motion value corresponding to the motion detected using the at least one sensor and a second motion value corresponding to the motion detected by analyzing the image exceeds a specified threshold value; and correcting the image based on the motion detected by analyzing the image when the difference between the first motion value and the second motion value is equal to or less than the specified threshold value.

10. The method of claim 9, further comprising:
correcting the image based on the motion detected using the at least one sensor when the magnification of the camera is equal to or less than the specified value.

11. The method of claim 9, wherein the image is corrected by performing at least one of motion smoothing processing or image warping processing.

12. The method of claim 9, wherein the detecting of the motion of the electronic device by analyzing the image comprises:
analyzing the image using at least one of block matching, Kanade-Lucase-Tomasi (KLT) tracker, scale invariant feature transform (SIFT), or speeded up robust features (SURF) analysis schemes.

13. The method of claim 9, further comprising:
specifying the threshold value based on the magnification of the camera.

14. The method of claim 9, further comprising:
displaying the captured image or the corrected image through a display of the electronic device.

15. The method of claim 9, further comprising:
storing the corrected image in a memory of the electronic device.

16. The method of claim 9, wherein the at least one sensor includes a gyro sensor.

17. A non-transitory storage medium storing computer-readable instructions, wherein the instructions, when executed by an electronic device, cause the electronic device to:

capture an image using a camera;

detect a motion of the electronic device using at least one sensor of the electronic device;

detect the motion of the electronic device by analyzing the image when a magnification of the camera exceeds a specified value;

correct the image based on the motion detected using the at least one sensor when a difference between a first motion value corresponding to the motion detected using the at least one sensor and a second motion value corresponding to the motion detected by analyzing the image exceeds a specified threshold value; and correct the image based on the motion detected by analyzing the image when the difference between the first motion value and the second motion value is equal to or less than the specified threshold value.

18. The non-transitory storage medium of claim 17, wherein the instructions, when executed by an electronic device, further cause the electronic device to correct the image based on the motion detected using the at least one sensor when the magnification of the camera is equal to or less than the specified value.

19. The non-transitory storage medium of claim 17, wherein the instructions, when executed by an electronic device, further cause the electronic device to specify the threshold value based on the magnification of the camera.

20. The non-transitory storage medium of claim 17, wherein the instructions, when executed by an electronic device, further cause the electronic device to display, through a display of the electronic device, or store, in a memory of the electronic device, the captured image or the corrected image.

* * * * *